Dec. 8, 1931.  A. LEHMANN  1,835,656
AEROPLANE RESCUE PARACHUTE
Filed Dec. 27, 1930  2 Sheets—Sheet 1
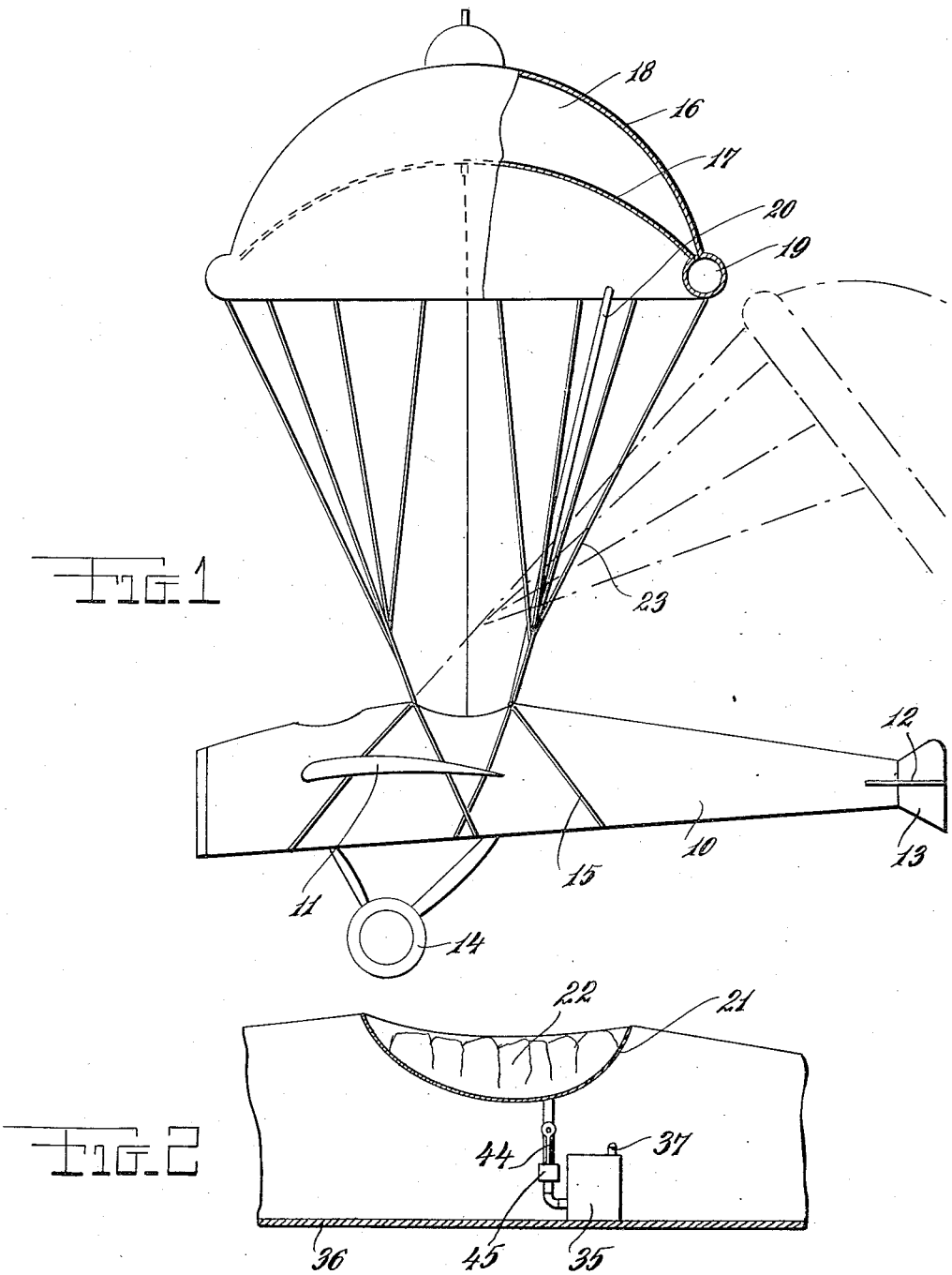
INVENTOR
A. Lehmann
BY ATTORNEY J. Ledermann Dec. 8, 1931.   A. LEHMANN   1,835,656
AEROPLANE RESCUE PARACHUTE
Filed Dec. 27, 1930   2 Sheets-Sheet 2
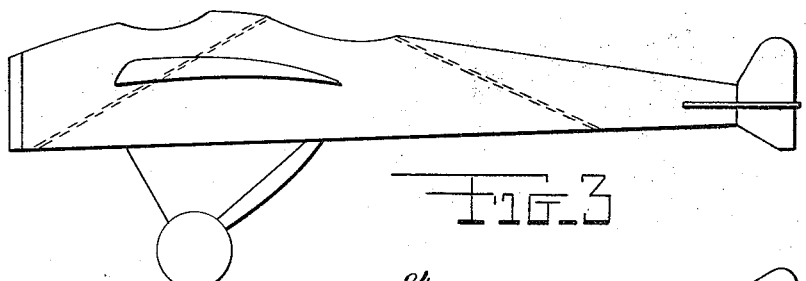
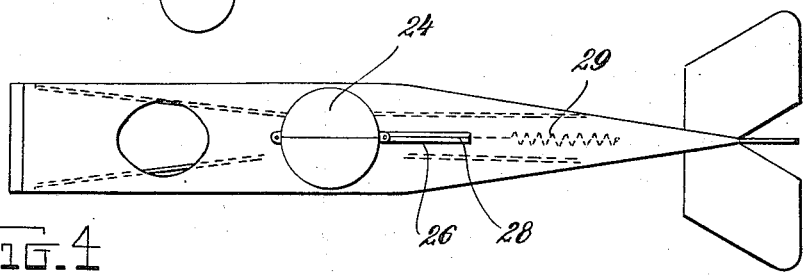
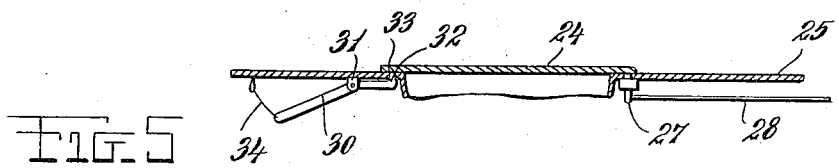
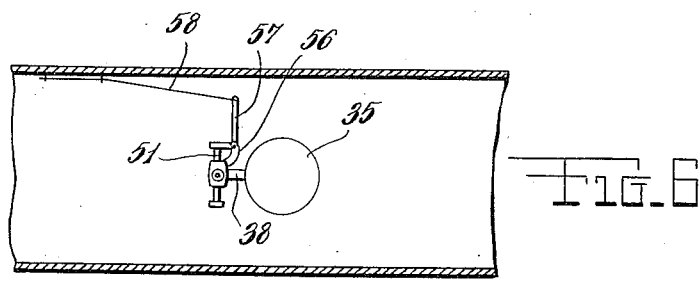
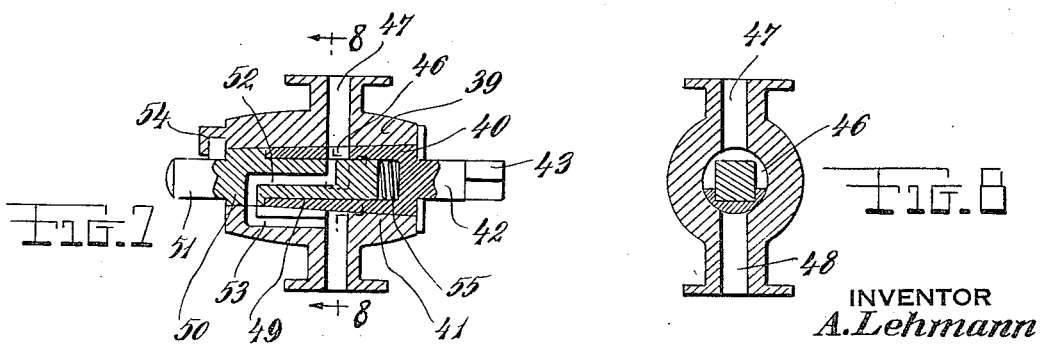
INVENTOR
*A. Lehmann*
BY ATTORNEY *J. Ledermann*

Patented Dec. 8, 1931

1,835,656

UNITED STATES PATENT OFFICE

ALBERT LEHMANN, OF NEW YORK, N. Y.

AEROPLANE RESCUE PARACHUTE

Application filed December 27, 1930. Serial No. 505,024.

The main object of this invention is to provide a rescue parachute for aeroplanes or the like which has the purpose of providing parachute suspension means which will open and unfurl in a positive manner automatically upon the aeroplane going into a nose dive or the like.

Another object of the invention is to provide a parachute for the suspension of aeroplanes or the like which may be manually or automatically unfurled and opened as the aircraft assumes a critical diving angle.

Still another object of the invention is to provide a parachute suitable for suspending and supporting aircraft. The parachute is so constructed as to be positively unfurled and opened by the introduction of liquefied or gaseous carrying gas into a compartment in the parachute.

A further object of the invention is to equip an aeroplane with a parachute for the purpose of suspending the aeroplane when damaged; said parachute being normally housed in the fuselage beneath a cover which is automatically opened as the aircraft assumes a critical diving angle.

A still further object of the invention is to provide an aircraft with a parachute which is adapted to be positively opened and unfurled by the introduction of a liquefied or other gas by the manipulation of a valve which may be automatically or manually operated.

The above and other objects will become apparent in the description below in which characters of reference refer to like named parts in the drawings.

Referring briefly to the drawings, Figure 1 is a front elevational view showing an aeroplane suspended from my type of parachute.

Figure 2 is a fragmentary longitudinal, sectional, elevational view showing the parachute pouch built into the fuselage and the gas tank and automatically operating valve.

Figure 3 is a longitudinal, elevational view of an aeroplane showing the guy ropes and parachute pocket when equipped with my parachute.

Figure 4 is a top plan view of Figure 3 showing the means of operating the parachute pouch cover.

Figure 5 is an enlarged sectional side elevational view of a portion of the parachute pouch and means for latching the pouch cover in closed position.

Figure 6 is a sectional plan view through the fuselage showing the means of controlling the valve in a manual manner when introducing gas into the parachute.

Figure 7 is a longitudinal, sectional, elevational view of the manual and automatic valve showing the manual operating valve stem in opened position.

Figure 8 is a cross sectional view of Figure 7 taken on line 8—8 of Figure 7.

Referring in detail to the drawings the numeral 10 indicates the fuselage of an aeroplane. This fuselage is equipped with the conventional type of sustaining wings 11, elevational fin 12, a rudder 13 and the well known type of under carriage 14. At various positions about the rump of the fuselage 10 a number of girdle cables 15 are fastened. These girdles may be conveniently secured about the outside of the rump or beneath the skin of the fuselage as desired. I propose to sustain in suspended condition an aircraft of the type herein described or of any other type by means of a parachute which is opened by being inflated with a buoyant gas at the instant that the aeroplane goes into a vertical dive or arrives at a critical angle. The parachute utilized for this purpose is similar to the one upon which I have filed a patent application which has been allowed on November 24, 1930, and was filed February 20, 1930, and bears the Serial #429,895. I provide an inverted hemispherical roof 16 upon the parachute and beneath this roof an inverted hemispherical bottom 17 is constructed. This bottom joins the roof 16 at the edges of the latter and provides a space or pocket 18 suitable for the introduction of gases. The marginal edges of both the roof and bottom merge with an encircling angle conduit 19 to which bouyant gases are introduced through the medium of hose lines 20. Suitable means for valving the gas from the pocket 18 and from the conduit 19 are provided as in my previous patent application. These hose lines convey a buoyant gas from the fuselage of the aeroplane directly to the parachute upon the opening of a valve which will be more fully hereinafter described.

The fuselage of the aeroplane is equipped with a hemispherical pouch 21 in the confines of which is folded and furled parachute 22 heretofore described is secreted. The guy ropes 23 and all of the paraphernalia necessary for the successful functioning of the parachute are normally contained in the confines of the pouch 21 and is completely concealed from view or from interference with other functioning parts of the aeroplane by a cover or lid 24. The back 25 of the fuselage is provided with a longitudinal channel 26 in which a flanged pin 27 is slidably mounted. This pin is directly connected to an ear-like extension of the lid 24 and serves as a guide when said lid 24 is being moved rearwardly and longitudinally along the fuselage. The opposite end of the pin 27 has a cable 28 secured thereto. This cable has a compression spring 29 secured to its opposite end; said spring having its opposite end directly anchored to some stationary portion of the fuselage. This spring 29 is normally in condition to retract the lid 24 so as to uncover the pouch but is retained in closed and covering position by a latch which may be operated through means of a lever (not shown) by the pilot from the cockpit of the aeroplane. The latching means comprises an obtuse angled bell crank 30 which is fulcrumed between a pair of adjacently positioned ears 31 and has its tongue 32 normally engaged in an opening 33 formed in the cover or lid 24 at the forward end of the latter. The opposite end of the obtuse angled bell crank has a small gaged cable 34 secured thereto by which means the bell crank 30 is swung from the latching to the released position.

Beneath the pouch 21 a fuel tank 35 is located on the floor 36 of the fuselage. This fuel tank is adapted to receive such buoyant gas as helium or hydrogen or any other buoyant gas in either the liquefied or gaseous state. This gas tank is provided with an inlet valve 37 through which the liquefied or other gas is introduced into the tank. A pipe line 38 communicates with the tank 35 and is directly connected to the plurality of hose lines 20 which extend to the parachute. In series with this pipeline 38 a valve body is mounted. This valve body is so constructed as to permit the operation of opening the valve to permit circulation through the pipe line in either a manual or automatic manner. Rotatable valve stem 40 is mounted within a conical opening 41 in the valve body. This rotatable valve 40 has a stem 42 which is provided with a square end 43. A bar 44 is attached to this square end 43 and is provided with a weight 45 at its lower end, the bar and weight being adapted to serve as a pendulum to rotate the valve member 40 as the aeroplane tilts into a nose dive or a tail spin. Intermediate the length of the valve body 40 an annular channel 46 of more than 180° of arc in length is formed. This channel at all times communicates with the entrance port 49 of the valve body 39 which when the rotatable valve 40 is in open position the ends of the channel 46 is in communication with both the inlet port 47 and the exit port 48, the latter being located diametrically opposite the former. A square bore 49 is formed within the rotatable valve 40 and has reciprocally mounted therein a pouch valve 50 provided with a stem 51. This pouch valve has an irregularly formed passageway 52 provided therein which continually is in communication with the inlet port 47 by tapping the channel 46 when the push valve is in open position while its other end communicates with a bypass channel 53 when the push valve is in open position. A shoulder is provided on the push valve 50 which is adapted to be engaged by a hook-like tongue 54 when the push valve is projected outwardly to the closed position by a coil spring 55 located in the bore 49 of the rotatable valve 40. The body 39 of the valve has an arm 56 encircled therewith on which the intersecting ends of a bore crank 57 are pivoted. This bell crank is operating through means of a cable 58 by the same lever it operates the bell crank 30 of the lid latching means.

The device is adapted to serve as a rescuing member and its purpose is to suspend a complete aeroplane and load in the air in slowly descending fashion by means of the parachute illustrated in the drawings. The entire folded parachute including the gas delivery hose lines 20 are all folded and furled into the pouch 21 when the parachute is not required for use. The cover or lid 24 conceals the entire device from view and also protects the parachute from the elements. Should the pilot of the plane become incapacitated from the instant that the ship enters a tail spin or nose dive, the conduit 19 which encircles the lower edges of the parachute structure and the pocket 18 is instantly inflated by some suitable buoyant gas such as hydrogen or helium which may be contained and transported in the tank 35 in a liquefied or gaseous form. The pilot pulls upon the cable 34 thus partly rotating the bar crank 30 and thereby unlatching the lid 24. The spring 29 will immediately slide this lid rearwardly on the fuselage and will thereby uncover the pouch 21 in which the furled parachute is then located. After a 90° or near 90° nose dive occurs the pendulum weight 45 will automatically remain in its original position and since the ship has then turned 90° the channel 46 in the valve assumes a position at 90° to that shown in Figure 8 and will thereby permit communication between the inlet and outlet ports 47 and 48 respectively. This will permit the helium in either state to circulate in the tank 35 through the pipe line 38 into the hose lines to finally enter the confines of the conduit 19 and pocket 18. The open pocket located beneath the bottom 17 of the parachute serves as a cushion of air to brake the descent of the aeroplane when suspended from the parachute structure. To permit the manual operation of the valve at any time by the pilot of the aircraft a push valve 50 is provided. This push valve is slidable within the rotatable valve 40 and one end of the passageway 52 located in the push valve is urged into communication with the channel 46 by depressing the stem 51 upon application of a pull upon the bell crank 57. As that particular end of the passageway is urged into aligned position with the channel 46 the opposite end of the same passage 52 aligns itself with the bypass 53 thereby permitting latching from the inlet port 47 through the passageway 52 thence through the bypass 53 to the outlet port 48. In this manner thereby also inflating the parachute with gas of a buoyant nature.

It will therefore be seen that with this particular type of device a parachute is provided which positively must open on account of the buoyant gases inflating the conduit 19 and the pocket 18 to its normal unfurled condition and as soon as this is accomplished the air stream will impinge upon the surface of the bottom 17 thereby tilting the parachute which will at this instant serve as a brake for retarding the rapid descent or fall of the aircraft which has for its equipment this particular type of parachute.

It is to be noted that certain changes in form and construction may be made without departing from the spirit and scope of the invention.

I claim:

1. In combination with an aeroplane having a pouch, means in said pouch for sustaining said aeroplane in descent comprising a parachute having an encircling tube and a pocket therein, said tube and pocket being adapted to be filled with buoyant gas, said parachute being furled in said pouch when not in use, valve controlled means for manually and mechanically inflating said parachute when said aeroplane goes into a nose dive, said means comprising a valve, a tank in said aeroplane, a pipe extending from said tank, hoses communicating with said pipe and said parachute ring, rotatable means in said valve body for mechanically opening said valve when said aeroplane goes into a nose dive and slidable means in said rotating means for manually operating said valve.

2. In combination with an aeroplane having a pouch, means in said pouch for sustaining said aeroplane in descent comprising a parachute having an encircling tube and a pocket therein, said tube and pocket being adapted to be filled with buoyant gas, said parachute being furled in said pouch when not in use, a gas tank communicating with said tube and pocket, a valve body, a pipe having said valve body connected in series therewith extending from said tank to said pouch, two hoses communicating with said pipe and said tube, a rotatable member movable in said valve body adapted to open and close communication with said valve body, means connected to said valve for rotating the latter in event of a nose dive of said aeroplane and slidable means in said rotatable member for opening said valve manually when desired.

3. In combination with an aeroplane having a pouch, means in said pouch for sustaining an aeroplane in descent comprising a parachute having an encircling tube and a pocket therein, said tube and pocket being adapted to be filled with buoyant gas, said parachute being furled in said pouch when not in use, a tank mounted in said aeroplane being adaptable for filling with liquefied or other buoyant gas, hoses leading from said pouch to said tube, a pipe line connecting said tank and said hoses, a valve body mounted in series on said pipe, a rotatable valve member in said valve body, a pendulum lever connected to said rotatable valve member for rotating said valve to cause communication through said valve body upon diving of said aeroplane and slidable means in said rotatable valve member for manually opening said valve body without interruption of the function of said rotatable valve member.

4. In combination with an aeroplane having a pouch, means in said pouch for sustaining an aeroplane in descent comprising a parachute having an encircling tube and a pocket therein, said tube and pocket being adapted to be filled with buoyant gas, said parachute being furled in said pouch when not in use, a tank mounted in said aeroplane being adaptable for filling with liquefied or other buoyant gas, hoses leading from said pouch to said tube, a pipe line connecting said tank and said hoses, a valve body mounted in series on said pipe, a rotatable valve member in said valve body, a pendulum lever connected to said rotatable valve member for rotating said valve to cause communication through said valve body upon diving of said aeroplane, a push valve slidable within said rotatable valve, a channel in said rotatable valve member adapted to close and open communication through said valve body and means in said push valve serving as a by-pass and communicating with said channel to open said valve manually.

5. In combination with an aeroplane having a pouch, means in said pouch for sustaining an aeroplane in descent comprising a parachute having an encircling tube and a pocket therein, said tube and pocket being adapted to be filled with buoyant gas, said parachute being furled in said pouch when not in use, a tank mounted in said aeroplane being adaptable for filling with liquefied or other buoyant gas, hoses leading from said pouch to said tube, a pipe line connecting said tank and said hoses, a valve body mounted in series on said pipe, a rotatable valve member in said valve body, a pendulum lever connected to said rotatable valve member for rotating said valve to cause communication through said valve body upon diving of said aeroplane, a push valve slidable within said rotatable valve, a channel in said rotatable valve member adapted to close and open communication through said valve body, said push valve being square in cross-section, a passageway in said push valve, a by-pass in said valve body, said push valve in retracted position being adapted to communicate with said channel and said by-pass to permit manual opening of communication through said valve body and means for extending said push valve to closed position upon the absence of pressure on said push valve.

6. In combination with an aeroplane having a pouch, means in said pouch for sustaining an aeroplane in descent comprising a parachute having an encircling tube and a pocket therein, said tube and pocket being adapted to be filled with buoyant gas, said parachute being furled in said pouch when not in use, a tank mounted in said aeroplane being adaptable for filling with liquefied or other buoyant gas, hoses leading from said pouch to said tube, a pipe line connecting said tank and said hoses, a valve body mounted in series on said pipe, a rotatable valve member in said valve body, a pendulum lever connected to said rotatable valve member for rotating said valve to cause communication through said valve body upon diving of said aeroplane, a push valve slidable within said rotatable valve, a channel in said rotatable valve member adapted to close and open communication through said valve body, said push valve being square in cross-section, a passageway in said push-valve, a by-pass in said valve body, said push valve in retracted position being adapted to communicate with said channel and said by-pass to permit manual opening of communication through said valve body, and means for extending said push valve to closed position upon the absence of pressure on said push valve, and a yieldable member for urging said push valve outwardly to the normally closed position.

7. In combination with an aeroplane having a pouch, means in said pouch for sustaining an aeroplane in descent comprising a parachute having an encircling tube and a pocket therein, said tube and pocket being adapted to be filled with buoyant gas, said parachute being furled in said pouch when not in use, a tank mounted in said aeroplane being adaptable for filling with liquefied or other buoyant gas, hoses leading from said pouch to said tube, a pipe line connecting said tank and said hoses, a valve body mounted in series on said pipe, a rotatable valve member in said valve body, a pendulum lever connected to said rotatable valve member for rotating said valve to cause communication through said valve body upon diving of said aeroplane, a push valve slidable within said rotatable valve, a channel in said rotatable valve member adapted to close and open communication through said valve body, said push valve being square in cross-section, a passageway in said push valve, a by-pass in said valve body, said push valve in retracted position being adapted to communicate with said channel and said by-pass to permit manual opening of communication through said valve body and means for extending said push valve to closed position upon the absence of pressure on said push valve, a bore in said rotatable valve member slidably receiving said push valve, a spring in said bore urging said push valve outwardly and a shoulder member on said valve body for limiting the extension outwardly of said push valve when in closed condition, said passageway being adapted to disalign with said channel in said rotatable member and said by-pass when said push valve is in extended position.

8. In combination with an aeroplane having a pouch, means in said pouch for sustaining an aeroplane in descent comprising a parachute having an encircling tube and a pocket therein, said tube and pocket being adapted to be filled with buoyant gas, said parachute being furled in said pouch when not in use, a tank mounted in said aeroplane being adaptable for filling with liquefied or other buoyant gas, hoses leading from said pouch to said tube, a pipe line connecting said tank and said hoses, a valve body mounted in series on said pipe, a rotatable valve member in said valve body, a pendulum lever connected to said rotatable valve member for rotating said valve to cause communication through said valve body upon diving of said aeroplane, a push valve slidable within said rotatable valve, a channel in said rotatable valve member adapted to close and open communication through said valve body, said push valve being square in cross-section, a passageway in said push valve, a by-pass in said valve body, said push valve in retracted position being adapted to communicate with said channel and said by-pass to permit manual opening of communication through said valve body and means for extending said push valve to closed position upon the absence of pressure on said push valve, a bore in said rotatable valve member slidably receiving said push valve, a spring in said bore urging said push valve outwardly and a shoulder member on said valve body for limiting the extension outwardly of said push valve when in closed condition, said passageway being adapted to disalign with said channel in said rotatable member and said by-pass when said push valve is in extended position and means for concealing said parachute in said pouch.

9. In combination with an aeroplane having a pouch, means in said pouch for sustaining an aeroplane in descent comprising a parachute having an encircling tube and a pocket therein, said tube and pocket being adapted to be filled with buoyant gas, said parachute being furled in said pouch when not in use, a tank mounted in said aeroplane being adaptable for filling with liquefied or other buoyant gas, hoses leading from said pouch to said tube, a pipe line connecting said tank and said hoses, a valve body mounted in series on said pipe, a rotatable valve member in said valve body, a pendulum lever connected to said rotatable valve member for rotating said valve to cause communication through said valve body upon diving of said aeroplane, a push valve slidable within said rotatable valve, a channel in said rotatable valve member adapted to close and open communication through said valve body, said push valve being square in cross-section, a passageway in said push valve, a by-pass in said valve body, said push valve in retracted position being adapted to communicate with said channel and said by-pass to permit manual opening of communication through said valve body and means for extending said push valve to closed position upon the absence of pressure on said push valve, a bore in said rotatable valve member slidably receiving said push valve, a spring in said bore urging said push valve outwardly and a shoulder member on said valve body for limiting the extension outwardly of said push valve when in closed condition, said passageway being adapted to disalign with said channel in said rotatable member and said by-pass when said push valve is in extended position a lid covering said pouch, yieldable means connected to said lid for retracting said lid to uncover said pouch and means for latching said lid in closed condition.

10. In combination with an aeroplane having a pouch, means in said pouch for sustaining an aeroplane in descent comprising a parachute having an encircling tube and a pocket therein, said tube and pocket being adapted to be filled with buoyant gas, said parachute being furled in said pouch when not in use, a tank mounted in said aeroplane being adaptable for filling with liquefied or other buoyant gas, hoses leading from said pouch to said tube, a pipe line connecting said tank and said hoses, a valve body mounted in series on said pipe, a rotatable valve member in said valve body, a pendulum lever connected to said rotatable valve member for rotating said valve to cause communication thru said valve body upon diving of said aeroplane, a push valve slidable within said rotatable valve, a channel in said rotatable valve member adapted to close and open communication through said valve body, said push valve being square in cross-section, a passageway in said push valve, a by-pass in said valve body, said push valve in retracted position being adapted to communicate with said channel and said by-pass to permit manual opening of communication through said valve body and means for extending said push valve to closed position upon the absence of pressure on said push valve, a bore in said rotatable valve member slidably receiving said push valve, a spring in said bore urging said push valve outwardly and a shoulder member on said valve body for limiting the extension outwardly of said push valve when in closed condition, said passageway being adapted to disalign with said channel in said rotatable member and said by-pass when said push valve is in extended position a lid covering said pouch, a coil spring in said aeroplane connected to said lid adapted to retract the latter to uncover said pouch and means for latching said lid in closed condition.

11. In combination with an aeroplane having a pouch, means in said pouch for sustaining an aeroplane in descent comprising a parachute having an encircling tube and a pocket therein, said tube and pocket being adapted to be filled with buoyant gas, said parachute being furled in said pouch when not in use, a tank mounted in said aeroplane being adaptable for filling with liquefied or other buoyant gas, hoses leading from said pouch to said tube, a pipe line connecting said tank and said hoses, a valve body mounted in series on said pipe, a rotatable valve member in said valve body, a pendulum lever connected to said rotatable valve member for rotating said valve to cause communication thru said valve body upon diving of said aeroplane, a push valve slidable within said rotatable valve, a channel in said rotatable valve member adapted to close and open communication through said valve body, said push valve being square in cross-section, a passageway in said push valve, a by-pass in said valve body, said push valve in retracted position being adapted to communicate with said channel and said by-pass to permit manual opening of communication through said valve body and means for extending said push valve to closed position upon the absence of pressure on said push valve, a bore in said rotatable valve member slidably receiving said push valve, a spring in said bore urging said push valve outwardly and a shoulder member on said valve body for limiting the extension outwardly of said push valve when in closed condition, said passageway being adapted to disalign with said channel in said rotatable member and said by-pass when said push valve is in extended position a lid covering said pouch, a coil spring in said aeroplane connecting to said lid adapted to retract the latter to uncover said pouch and a bell crank cooperating with said lid to secure the latter in covered position over said pouch and means for manually operating said bell crank and said push valve means to simultaneously uncover said pouch and manually operate said push valve.

In testimony whereof I affix my signature.

ALBERT LEHMANN.